Oct. 23, 1945.  F. A. KUNTZ  2,387,451
CANTILEVER SEAT
Filed Nov. 2, 1944  2 Sheets-Sheet 1
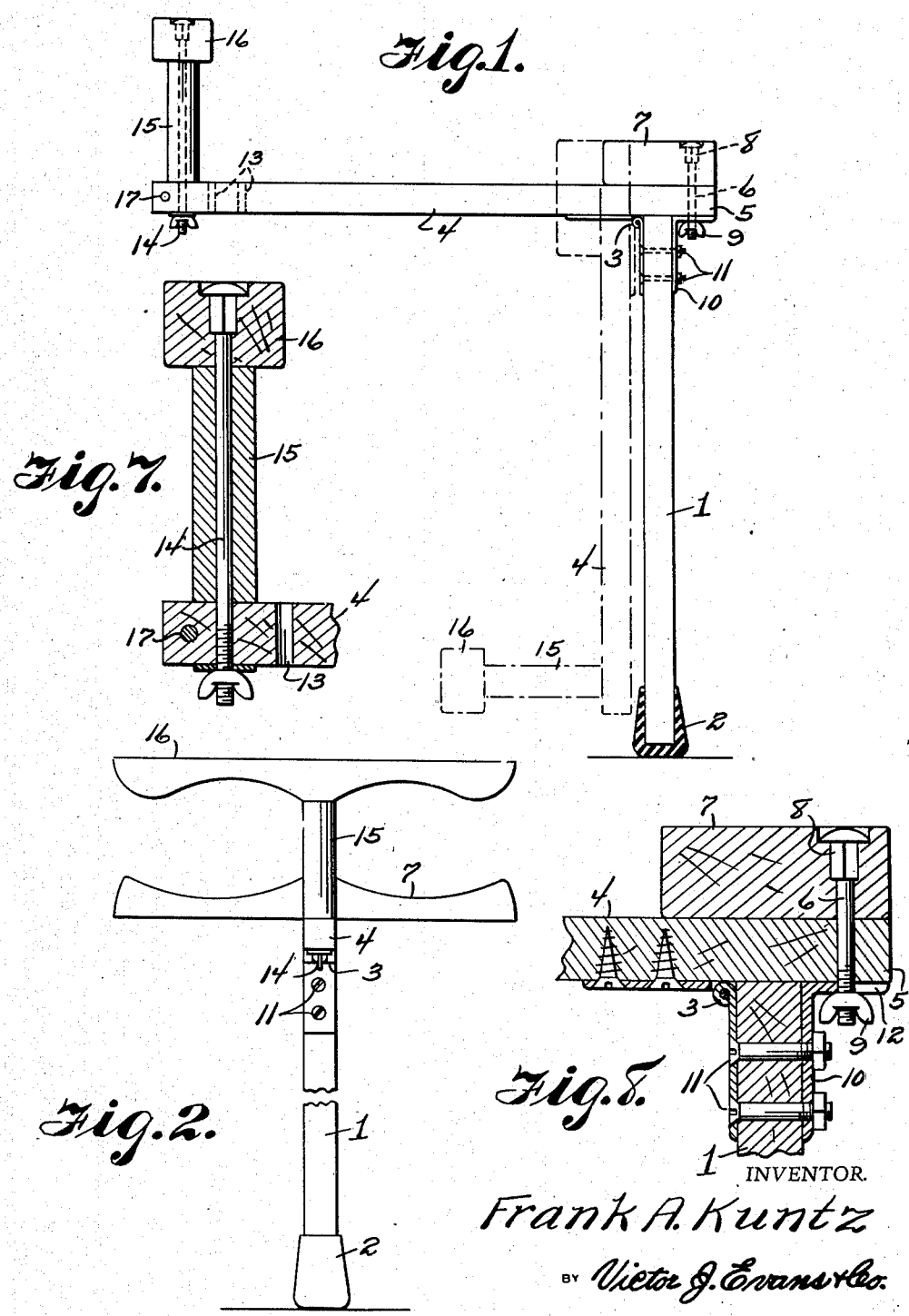
INVENTOR.
Frank A. Kuntz
BY Victor J. Evans & Co.
ATTORNEYS Oct. 23, 1945.　　　　F. A. KUNTZ　　　　2,387,451
CANTILEVER SEAT
Filed Nov. 2, 1944　　　　2 Sheets-Sheet 2

INVENTOR.
Frank A. Kuntz
BY Victor J. Evans & Co.
ATTORNEYS

Patented Oct. 23, 1945

2,387,451

UNITED STATES PATENT OFFICE 2,387,451

CANTILEVER SEAT

Frank A. Kuntz, Allentown, Pa.

Application November 2, 1944, Serial No. 561,594

6 Claims. (Cl. 155—135)

My present invention, broadly considered, has to do with improvements in portable, knock-down seats of the type designed to be folded up in a compact parcel and stored, or transported from place to place, and then quickly set up for use when and where needed. To that end, I have provided a seating device, wherein but one supporting leg is used, and wherein a leverage arrangement effected by a horizontal bar and a knee engaging member properly throws the weight of a person on the seat and supporting leg and maintains the balance required for comfortable and relaxed seating.

In carrying out the above objects of my invention, I employ a horizontal bar on one end of which is adjustably mounted, and spaced upwardly therefrom a transverse member which engages over the knees, and at the opposite end of the bar is provided a seat, and below the seat a supporting leg. All of the above parts are movable or foldable into a compact parcel. The load represented by a person occupying the seat necessarily requires at least a three-point support support for stability and to that end, the horizontal bar and transverse bar engaging over the knees comfortably and conveniently distributes the stresses so that an equilibrium is maintained and a person is properly seated and relaxed.

Other and equally important objects and advantages of my invention are; (1) to provide a seat having a minimum number of parts, there being but one supporting leg, and those parts arranged to comfortably support the load; (2) to provide means for folding or moving the parts to form a small, convenient package which may be carried, or transported, or stored; (3) to provide a seat requiring a minimum of machined and fabricated parts such as nails, screw, hinges, bolts and the like, and (4) to provide a seat which may be manufactured and sold at relatively small cost and may be principally fabricated of plastics, wood or metal whichever material is available of least expense and labor.

Still other objects and advantages will be apparent from the following detailed description and drawings, but changes may be made in materials, form, size, shape, construction and arrangement of parts without departing from my broad inventive concept, or the scope of the appended claims.

In the drawings wherein I have illustrated a preferred form of my invention:

Figure 1 is a side elevation of my seat, showing in dotted lines the manner of folding the same;

Figure 2 is a front elevation;

Figure 7 is a section through the knee bar, spacer and the end of the horizontal bar showing the adjusting openings and taken on line 7—7 of Figure 3;

Figure 8 is a section through the seat, end of horizontal bar, and top of the leg, showing the relationship and hinge connections, and taken on line 8—8 of Figure 3.

In the drawings wherein like characters of reference are used to designate like or similar parts:

Figure 3:
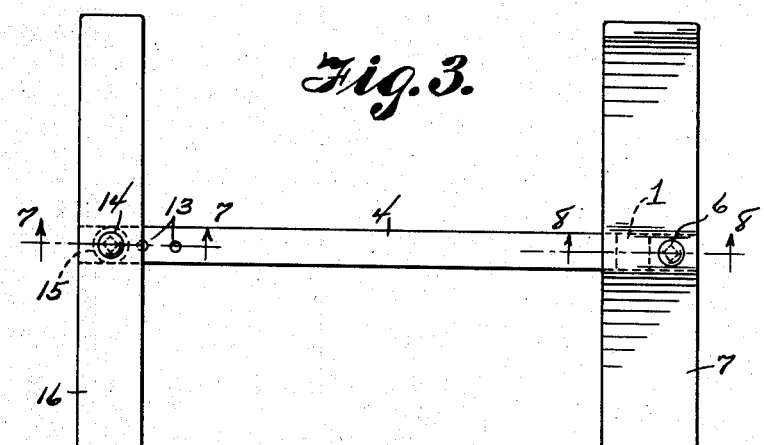
Figure 3 is a top plan view.
Figure 4:
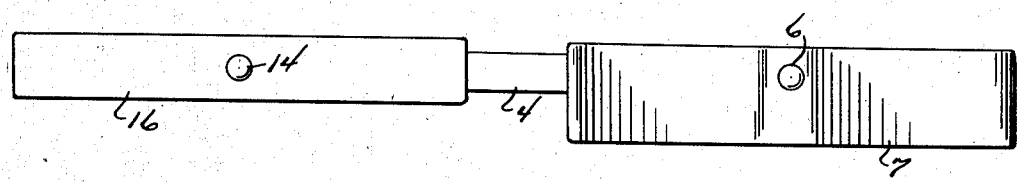
Figure 4 is a top plan view showing the seat and knee bar pivoted to a folded compact position in line with the horizontal bar.
Figure 5:
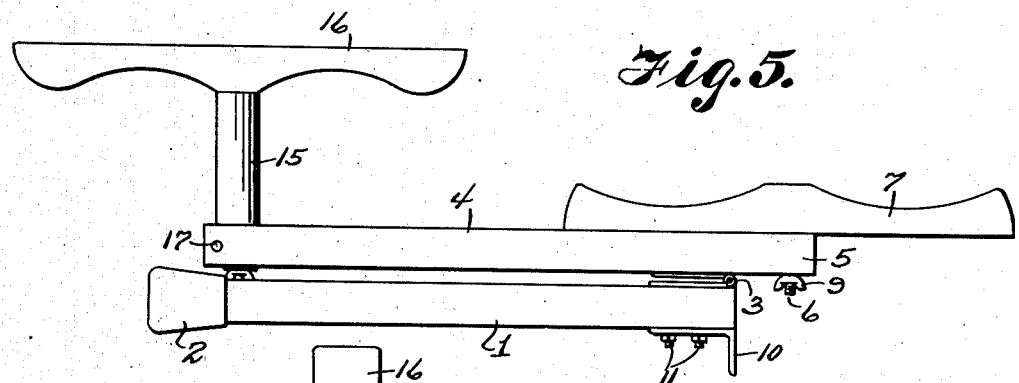
Figure 5 is a side view of the seat folded up into a compact parcel.
Figure 6:
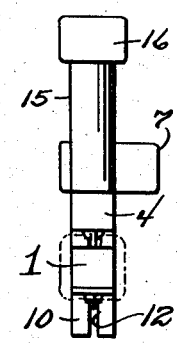
Figure 6 is an end view of the seat folded up into a compact parcel.

The numeral 1 designates a leg or supporting post, which has a rubber foot 2 to prevent scratching of surfaces on which the seat is used. Hingedly connected as at 3 to the top of the leg is a horizontal bar 4. It will be noted that one leaf of the hinge engages one side of the leg and that the other leaf engages the under side of the horizontal bar at a point spaced from its end, so that the overhanging portion 5 of the bar 4 engages in set-up position on the end of the leg 1 and overlies the opposite side of the leg. Bolted as at 6 to the overhanging part of the horizontal member 4 is a seat member 7 properly curved and formed to fit the body. The seat has fixed engagement with the squared end 8 of the bolt 6 and the bolt is pivotally mounted in the bar 4 and has a wing nut 9 on its threaded end. An angle iron 10 is attached by the hinge bolts 11 to the top of the leg 1 and its outstanding arm is slotted as at 12 to receive the bolt 6 so that the bolt 6 functions to hold the leg in vertical position of the bar 4 when the wing nut is screwed down as in Figure 8, or upon release of the nut the bar may be swung down to lie against the leg 1 as in the dotted line position of Figure 1. The seat 7 lies transversely of the bar 4 in active position and parallel with the bar 4, as in Figures 4 and 5, in passive or folded position.

The opposite end of horizontal bar 4 is provided with a plurality of spaced, aligned openings 13 through a selected one of which extends a bolt 14. The bolt extends upwardly a predetermined distance and carries a spacing member or sleeve 15. At the top of the bolt is mounted a knee bar 16 which is suitably shaped to fit over the knees and which may be swung to an inactive position—as in Figures 4 and 5—parallel with bar 4. A reinforcing rod 17 is provided in the end of the bar. The knee bar is placed over the knees and adjusted in openings 13 to fit the size of the person occupying the seat 7, and the entire device may be folded into a compact parcel when not in use.

It is believed that the operation and advantages of my invention will be apparent from the foregoing, but it is emphasized that interpretation of the scope thereof should only be conclusive when made in the light of the subjoined claims.

I claim:

1. A seat comprising a horizontal bar, a single supporting leg attached to one end of the horizontal bar, a seat attached to said end of the horizontal bar, and a transversely extending knee engaging bar attached intermediate its ends to the opposite end of the horizontal bar and a spacing element between the horizontal bar and the knee engaging bar.

2. A seat comprising a horizontal bar, a single supporting leg hingedly attached to one end of the horizontal bar, a seat pivotally attached to said end of the horizontal bar, and a transversely extending knee engaging bar pivotally attached intermediate its ends to the opposite end of the horizontal bar and a spacing element between the horizontal bar and the knee engaging bar.

3. A foldable seat device, comprising a supporting bar lying in horizontal position when in active position, a single leg hingedly connected to said bar at a point spaced from one end thereof, a seat pivotally mounted on the bar at said end, a knee engaging bar, and elongated bolt pivotally supporting the knee engaging bar on the opposite end of the horizontal bar, a spacing element on the bolt between the knee bar and the horizontal bar, and means for adjusting the position of the bolt on the horizontal bar to adjust the distance between the knee bar and the seat.

4. The invention as defined in claim 3, and means for holding the leg in a position at right angles to the horizontal bar.

5. The invention as defined in claim 3, and an angle-iron carried by the end of the leg adjacent the horizontal bar, and means for attaching the same to the horizontal bar to hold the leg substantially at right angles thereto, said means being releasable.

6. The invention defined in claim 3 wherein the horizontal bar has plural, spaced, aligned openings in a selected one of which the knee bar bolt is receivable.

FRANK A. KUNTZ.